Oct. 9, 1928.
A. J. MOTTLAU
1,686,634
THERMOSTATIC REGULATOR
Filed Sept. 10, 1924   2 Sheets-Sheet 1
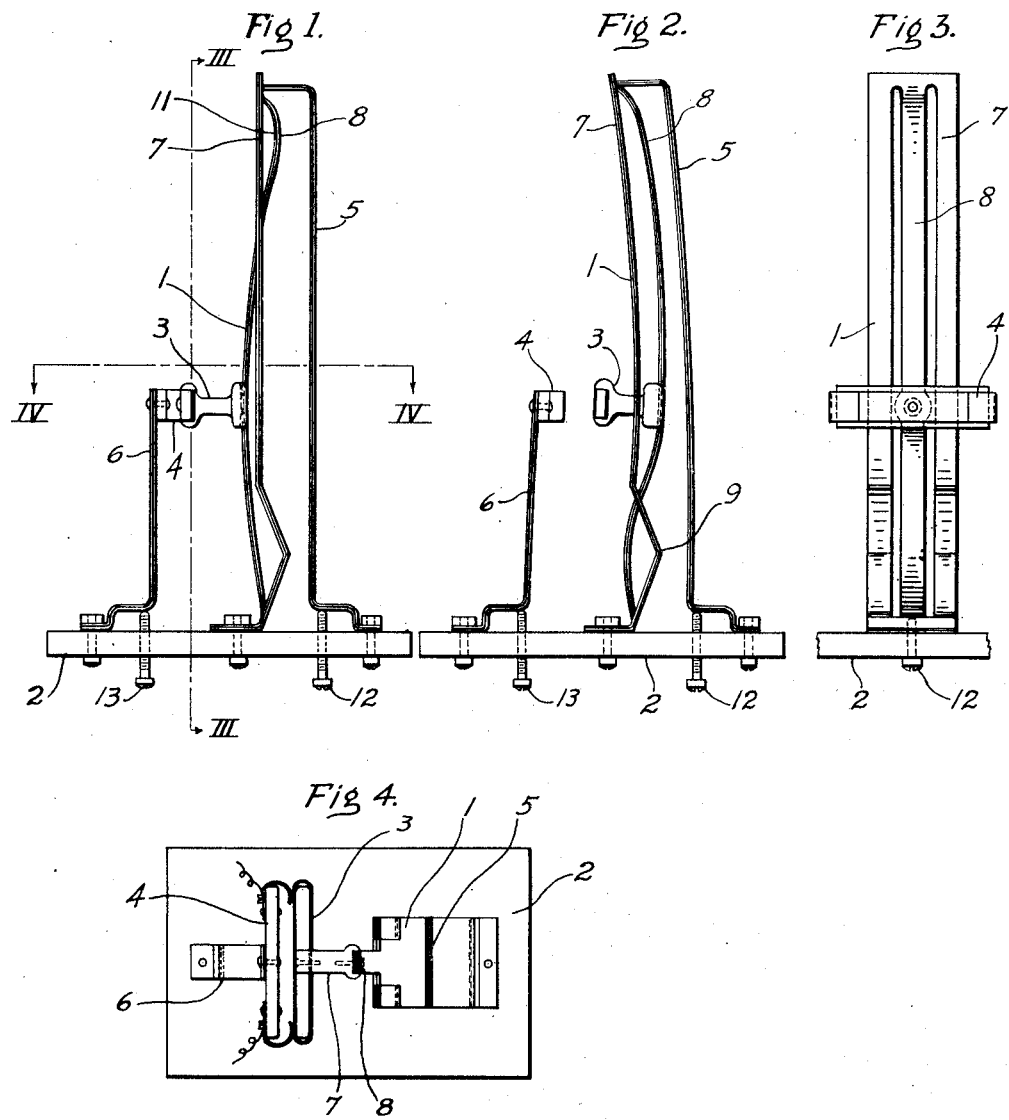
WITNESSES:
INVENTOR
August J. Mottlau.
BY
ATTORNEY Oct. 9, 1928.
A. J. MOTTLAU
1,686,634
THERMOSTATIC REGULATOR
Filed Sept. 10, 1924    2 Sheets-Sheet 2
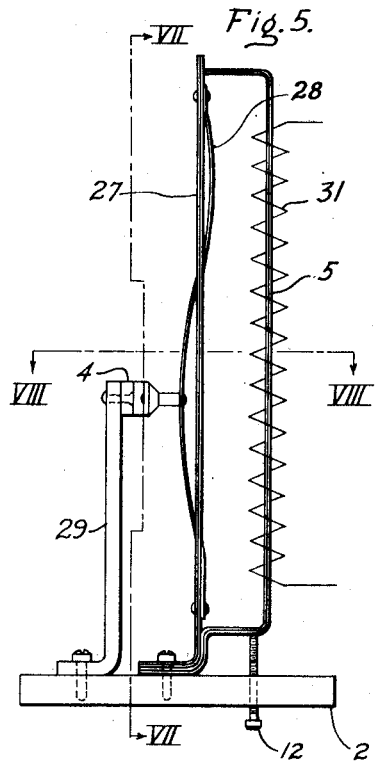
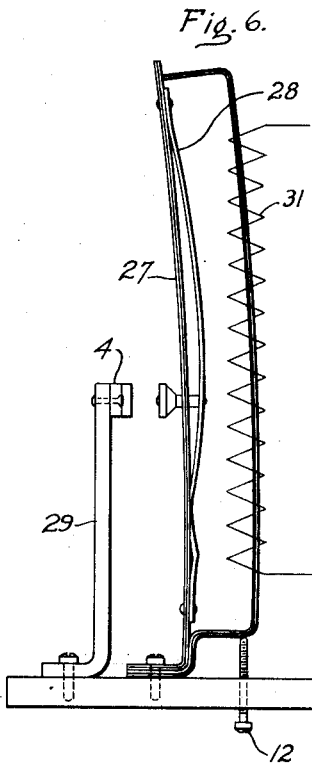
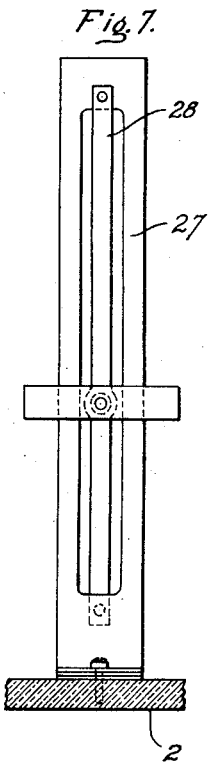
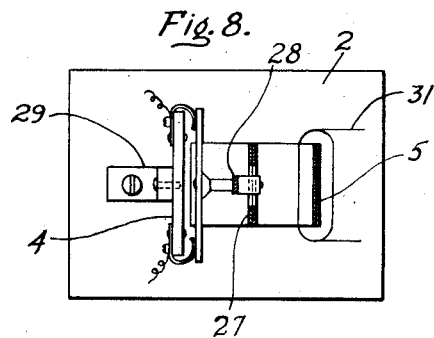
WITNESSES:
C. J. Weller.
Lester J. Audley
INVENTOR
August J. Mottlau
BY
Wesley G. Carr
ATTORNEY Patented Oct. 9, 1928.

1,686,634

UNITED STATES PATENT OFFICE.

AUGUST J. MOTTLAU, OF PITTSBURGH, PENNSYLVANIA, ASSIGNOR TO WESTINGHOUSE ELECTRIC & MANUFACTURING COMPANY, A CORPORATION OF PENNSYLVANIA.

THERMOSTATIC REGULATOR.

Application filed September 10, 1924. Serial No. 736,813.

My invention relates to thermostatic regulators and particularly to thermal adjusting devices therefor.

One object of my invention is to provide a pre-shaped thermostatic regulator that shall be capable of operation on more than a single range of thermal values.

Another object of my invention is to provide a thermostatic regulator that shall have provision whereby the critical thermal value at which it operates may be adjusted.

In my copending application for Letters Patent Serial No. 725,408, filed July 11, 1924, I have shown and described a thermostatic regulator that is formed by a stamping operation from a single sheet of thermoresponsive material, preferably bimetallic material. A thermostat made in accordance with that specification is capable of operating with a snap action at a critical temperature which is determined by the shape taken during the punching operation. By means of the present invention, I propose to make it possible to have that thermostatic regulator operate at different critical temperatures.

I propose to secure the foregoing results by providing a pre-shaped thermostatic regulator with one or more bimetallic elements that bear against the regulator, such members having means for adjusting the initial pressure exerted on the thermostatic regulator. I further propose to combine a rigid support in combination with a bimetallic adjusting strip in order to secure the same results.

In the accompanying drawings,

Figure 1 is a side elevational view of my thermostatic regulator in the circuit making position.

Fig. 2 is a similar view of the thermostatic regulator in the circuit breaking position.

Fig. 3 is a front elevational view of my thermostatic regulator.

Fig. 4 is a sectional view, of my thermostatic regulator taken along the line IV—IV in Fig. 1.

Figs. 5, 6, 7 and 8 are views similar to Figs. 1, 2, 3 and 4, respectively, of a modified form of my invention.

Referring to Figs. 1 to 4, inclusive, of the drawings, my invention comprises, in general, a pre-shaped thermostatic regulator 1 that is mounted on a base plate 2 and having a movable contact member 3 for co-operation with a stationary contact member 4, together with adjusting members 5 and 6 of bimetallic material.

The thermostatic regulator 1 comprises a frame portion 7 and a middle portion or spring 8. The portions 7 and 8 are given certain deflections as indicated at points 9 and 11 in order that the thermostatic regulator may move the spring portion 8 with a snap action. The structural and functional details of these portions are set forth in my copending application. The base member 2 is provided with suitable adjusting screws 12 and 13 that bear against the adjusting strips 5 and 6 respectively, for varying the pressure exerted on the thermostatic regulator 1.

Assuming the thermostatic regulator to be in the position shown in Fig. 1, and the contact members 3 and 4 in engagement, an increase in the temperature of the thermostatic regulator 1 causes the latter to move as a whole to the left of Fig. 1, thereby increasing the pressure between the contact members 3 and 4. At the same time, the adjusting strip 5 moves to the left and tends to increase the curvature of the frame 7 of the thermostatic regulator 1. The adjusting member 6 moves to the right of Fig. 1, thereby causing a deflection of the spring member 8. These forces continue to increase as the temperature of the thermostatic regulator 1 increases until a point of unstable equilibrium is reached whereupon the spring portion 8 moves with a snap action into the position shown in Fig. 2 and the electrical engagement between the contact members 3 and 4 is broken.

As soon as the parts have cooled sufficiently, the several bimetallic members return to the positions in which they are shown in Fig. 1 and the spring portion 8 snaps back into its circuit-closing position.

In the event that it is desired to change the critical temperature at which the spring portion 8 snaps, it is only necessary to adjust the screws 12 and 13 in order to vary the total deflection of the thermostatic regulator 1 at any predetermined temperature.

It is obvious that the temperature at which the thermostatic regulator 1 alone operates is different from the temperature at which it operates when under the combined stress of the adjusting devices 5 and 6.

Referring to Figs. 5 to 8, inclusive, I have shown a modified thermostatic regulator. There is a frame 27 of bimetallic material and a spring portion 28 of steel that is not bimetallic. Also, the stationary contact member 4 is mounted on a non-resilient and non-thermoresponsive support 29. A heating coil 31 may be wound or disposed about the adjusting device 5 in order to facilitate the operation of the thermostatic regulator, if desired. In all other particulars, the two forms of my invention are alike and operate in substantially the same manner by reason of the fact that the steel spring 28 moves with a snap action in the same manner as does the bimetallic spring portion 8 in the other modification.

It will thus be seen that I have provided a thermostatic regulator that is capable of manufacture by a single punching operation upon bimetallic material and at the same time may be made to operate at different critical thermal values by the attaching of one or more bimetallic adjusting devices disposed in accordance with my invention.

I do not wish to be restricted to the specific arrangement of parts herein set forth, as various modifications thereof may be effected without departing from the spirit and scope of my invention. I desire, therefore, that only such limitations shall be imposed as are indicated in the appended claims.

I claim as my invention:

1. In a thermostat, a thermo-responsive device comprising at least two integral portions having different thermo-responsive characteristics and thermo-responsive adjusting means for changing the critical operating point of both portions.

2. In a thermostat, a thermo-responsive device comprising at least two integral portions having different thermo-responsive characteristics and thermo-responsive adjusting means for simultaneously changing the critical operating point of both portions.

3. In a thermostat, a thermo-responsive device comprising at least two integral portions having different thermo-responsive characteristics, and thermo-responsive adjusting means for simultaneously changing the thermal conditions under which both portions of the thermostat combine to affect the operation of the thermostat.

4. In a thermostat, a bimetallic thermo-responsive member having a snap action and a means for initially adjusting said thermo-responsive member, of thermo-responsive material for controlling the operation of the bimetallic member.

5. In a thermostat, a bimetallic thermo-responsive member having a snap action and a plurality of opposed bimetallic adjusting means for controlling the operation of the first named bimetallic member.

6. In a thermostat, a bimetallic thermo-responsive member having a snap action and a plurality of bimetallic adjusting means for exerting pressure in different directions upon the first named bimetallic member.

7. In a thermostat, a bimetallic thermo-responsive member having a snap action and a plurality of opposed bimetallic adjusting means for assisting the first named bimetallic member in producing the snap action at a desired temperature.

8. In a thermostat, a gradually moving member of thermo-responsive material, a rapidly moving member of similar material, and one or more adjusting members of thermo-responsive material for enabling the thermostat to overcome a desired point of instability.

9. In a thermostat, a thermo-responsive device embodying a snap action member and means for initially adjusting said device, composed of thermo-responsive material.

10. In a thermostat, a gradually moving member of thermo-responsive material, a rapidly moving member and one or more adjusting members composed of thermo-responsive material for enabling the thermostat to overcome a desired point of instability.

11. The combination with a resilient frame and a spring, having portions thereof deformed laterally of its length, supported by a portion of said frame, said spring being restrained from movement in one direction and responsive to a lateral bending of one end of said frame in the direction of restraint to deflect oppositely thereto with a snap action, of thermo-responsive means for bending one end of said frame in the direction of restraint.

12. The combination with a resilient frame and a spring, having portions thereof deformed laterally of its length, supported by a portion of said frame, said spring being restrained from movement in one direction and responsive to a lateral bending of one end of said frame in the direction of restraint to deflect oppositely thereto with a snap action, of a thermo-responsive bimetallic member for bending one end of said frame in the direction of restraint.

13. The combination with an apertured frame and a resilient member extending across the aperture thereof, said resilient member being restrained from movement in one direction and responsive to a bending of the frame in the direction of restraint to deflect oppositely thereto with a snap action, of thermally influenced means for bending said frame in the direction of restraint.

14. The combination with an apertured frame and a resilient member extending across the aperture thereof, said resilient member being restrained from movement in one direction and responsive to a bending of the frame in the direction of restraint to deflect oppositely thereto with a snap action, of a thermo-responsive bimetallic member for bending said frame in the direction of restraint.

In testimony whereof, I have hereunto subscribed my name this 3rd day of September, 1924.

AUGUST J. MOTTLAU.